No. 682,229. Patented Sept. 10, 1901.
C. E. PAULSON.
HAY RAKE AND COCKER.
(Application filed Apr. 9, 1901.)
(No Model.) 5 Sheets—Sheet 1.

Witnesses,
Inventor.
Chris E. Paulson,
By his Attorneys,

No. 682,229. Patented Sept. 10, 1901.
C. E. PAULSON.
HAY RAKE AND COCKER.
(Application filed Apr. 9, 1901.)

(No Model.) 5 Sheets—Sheet 2.

Witnesses,
Elizabeth Keehn
Harry Kilgore

Inventor:
Chris E. Paulson
By his Attorneys.
Williamson & Merchant

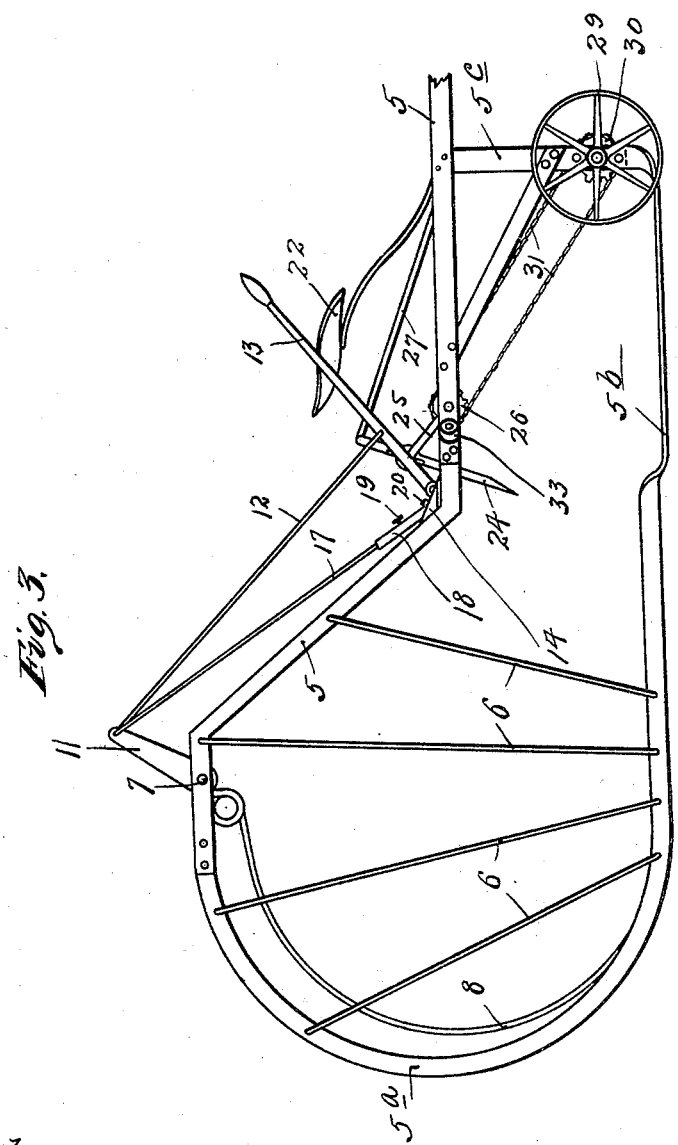

No. 682,229. Patented Sept. 10, 1901.
C. E. PAULSON.
HAY RAKE AND COCKER.
(Application filed Apr. 9, 1901.)
(No Model.) 5 Sheets—Sheet 4.
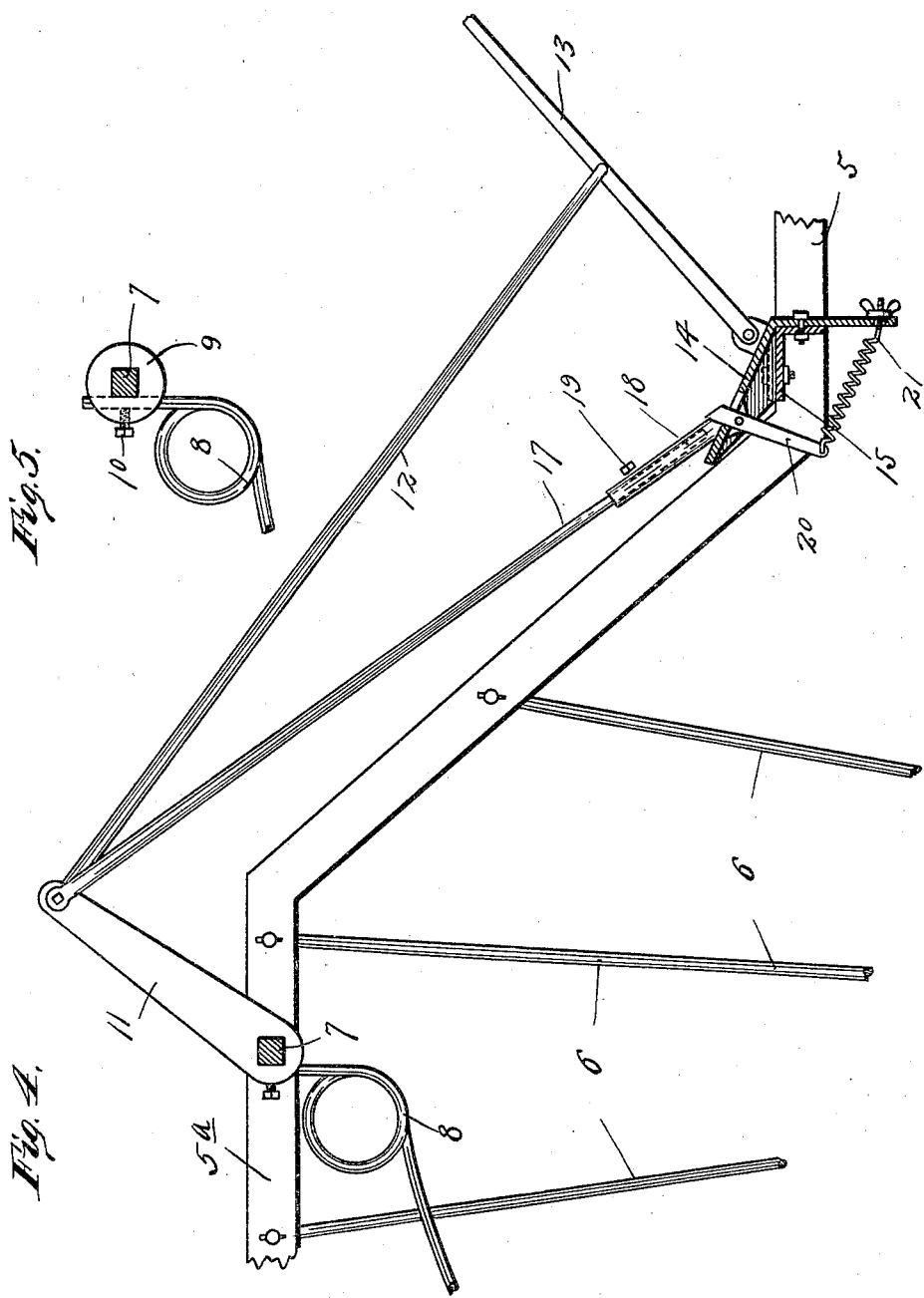
Witnesses,
Elizabeth Keeley
Harry Kilgore
Inventor,
Chris E. Paulson
By his Attorneys,
Williamson & Merchant

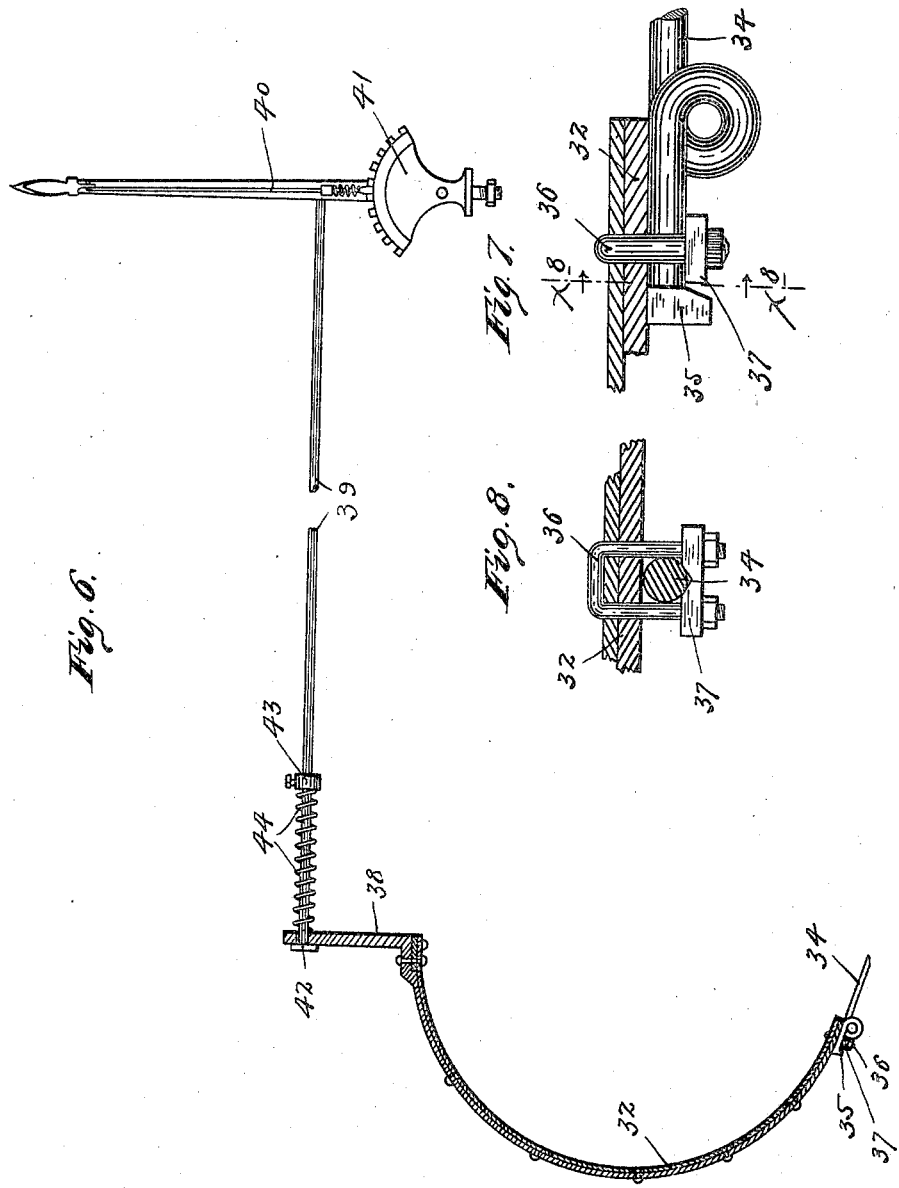

UNITED STATES PATENT OFFICE.

CHRIS E. PAULSON, OF BOYD, MINNESOTA.

HAY RAKE AND COCKER.

SPECIFICATION forming part of Letters Patent No. 682,229, dated September 10, 1901.

Application filed April 9, 1901. Serial No. 54,987. (No model.)

*To all whom it may concern:*

Be it known that I, CHRIS E. PAULSON, a citizen of the United States, residing at Boyd, in the county of Lac qui Parle and State of Minnesota, have invented certain new and useful Improvements in Hay Rakes and Cockers; and I do hereby declare the following to be a full, clear, and exact description of the invention, such as will enable others skilled in the art to which it appertains to make and use the same.

My invention has for its object to provide an improved hay-rake adapted to gather hay from the ground and to deposit the same at intervals in well-formed hay-cocks.

To the above ends the invention consists of the novel devices and combinations of devices hereinafter described, and defined in the claims.

The invention is illustrated in the accompanying drawings, wherein like characters indicate like parts throughout the several views.

Figure 1:
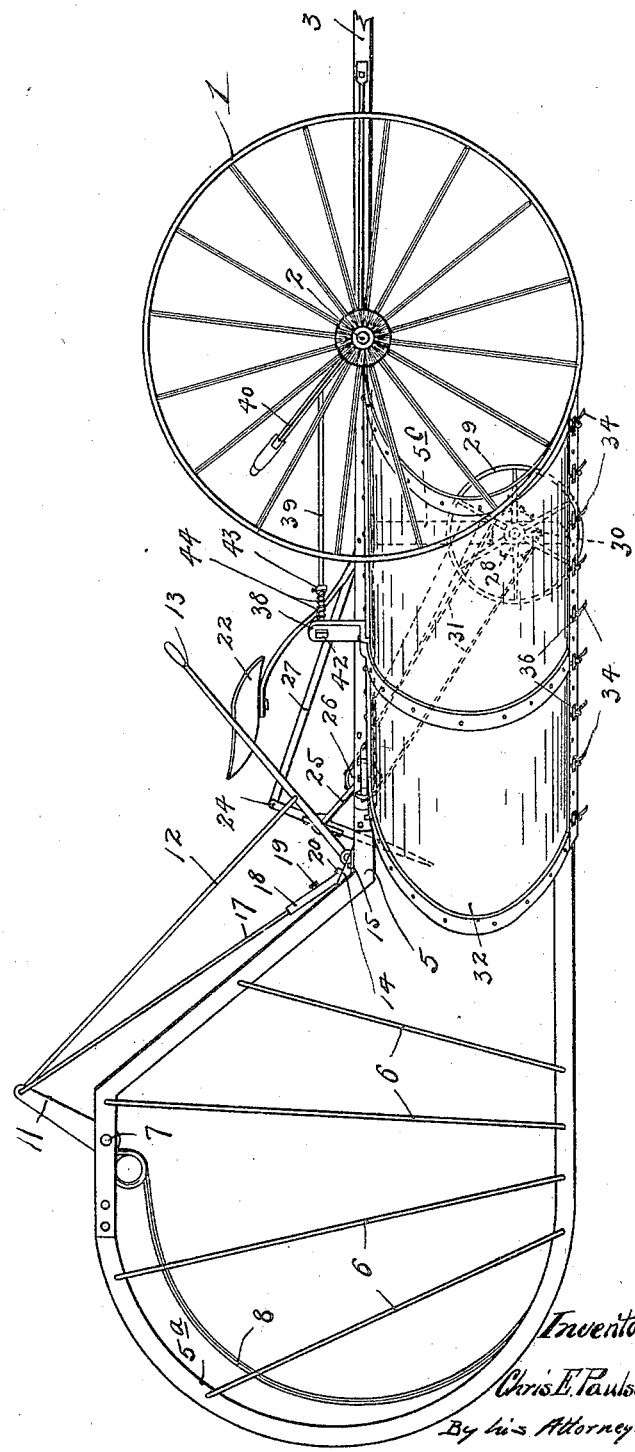
Figure 2:
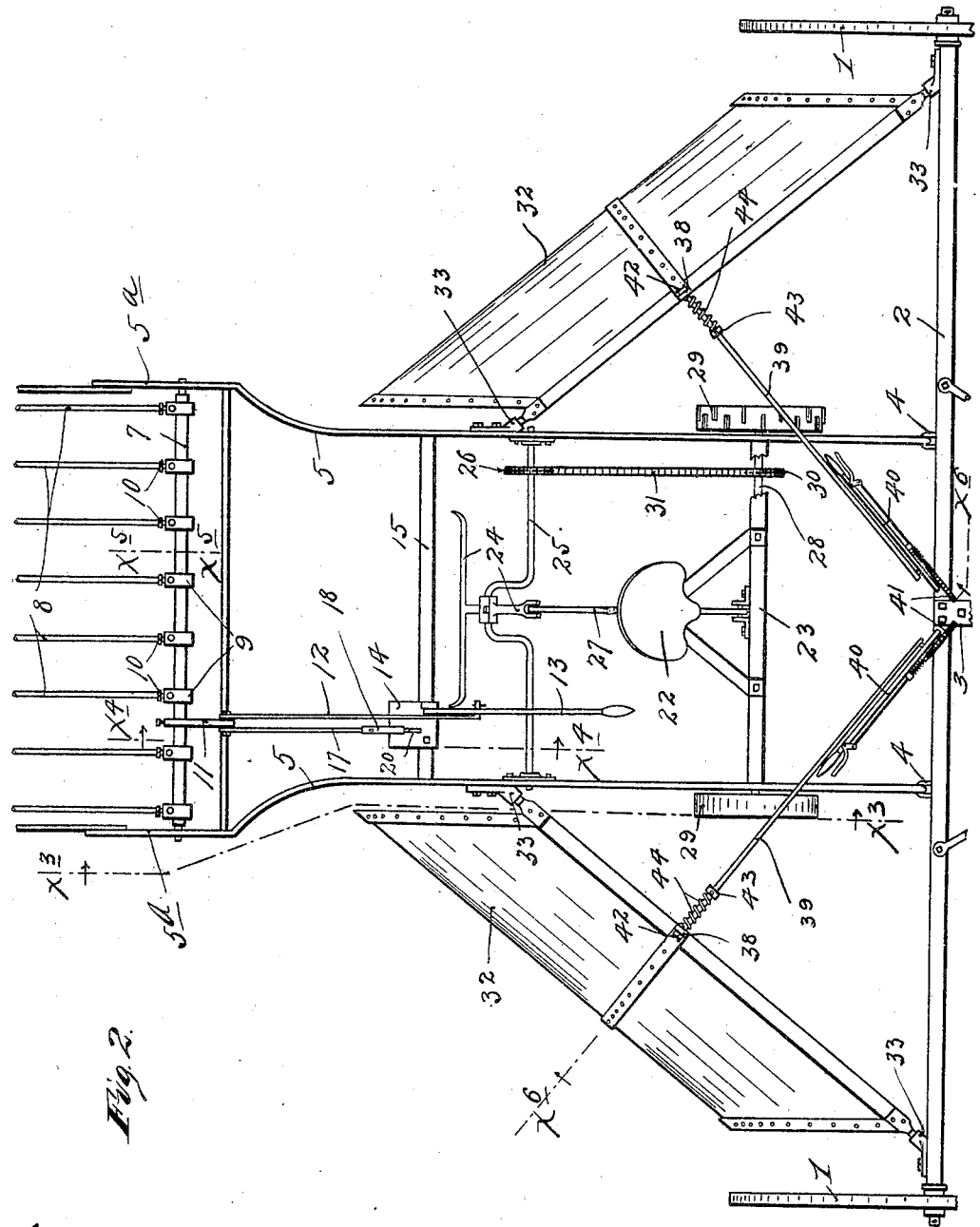

Figure 1 is a view in side elevation, showing my improved machine. Fig. 2 is a plan view of the same, some parts being broken away. Fig. 3 is a view, partly in side elevation and partly in section, on the line $x^3\ x^3$ of Fig. 2. Fig. 4 is a vertical section approximately on the line $x^4\ x^4$ of Fig. 2, some parts being broken away. Fig. 5 is a detail in section on the line $x^5\ x^5$ of Fig. 2, some parts being broken away. Fig. 6 is a detail in section approximately on the line $x^6\ x^6$ of Fig. 2. Fig. 7 is a detail view showing the manner in which the spring-fingers are secured to the bottoms of the collecting-plates, and Fig. 8 is a section on the line of $x^8\ x^8$ of Fig. 7.

The main truck-wheels 1 are loosely mounted on the ends of a long axle 2, from the central portion of which a tongue 3 projects forward. By means of staples or other suitable devices 4 the forward ends of a pair of long frame-bars 5 are pivotally connected. These bars 5 extend rearward, where they are looped, as indicated at $5^a$, and are then brought forward to form runners or ground-sections $5^b$, and are then turned upward at $5^c$ and rigidly connected to the bodies of the bars 5. As best shown in Figs. 1 and 3, a series of rods 6 extend across the looped portion $5^a$ of the said bars 5, and thus form the skeleton sides of an accumulating-space, the back of which is afforded by the hay-rake proper. This hay-rake preferably comprises a rock-shaft 7, suitably journaled in the looped portions $5^a$ of the said bars 5 and provided with spring-tines 8, connected thereto, as shown in Fig. 5, by retaining-collars 9 and set-screws 10. The shaft 7 has also an arm 11, which is connected by a rod 12 to a hand-lever 13, which is pivoted to a plate 14, secured on a transverse bar 15, which in turn is supported at its ends from the frame-bars 5, as best shown in Figs. 2 and 4. To the arm 11 of the shaft 7 is also pivotally connected one end of a trip-rod 17, provided at its free end with a telescopically-adjustable head 18, shown as secured by a set-screw 19. When the rake is thrown into an operative position, as indicated in the drawings, it is there held by the engagement of the head 18 with the outwardly-projecting end of the yielding detent 20, which works through and is pivoted to a plate 14, as best shown in Fig. 4. The detent 20 is yieldingly held by an adjustable spring 21, which connects the depending end thereof to a portion of the plate 14. The action of this detent will be considered later on. The free end of the lever 13 terminates within reach of the driver when seated in the seat 22, which seat is shown as supported from a transverse bar 23, and which bar is secured at its ends to the frame-bars 5.

A tedder 24 works in front of the rake and in front of the accumulating-space formed between the looped portions $5^a$ of the bars 5. This tedder is shown as pronged at its lower end, (see Fig. 2,) and it is driven by a crank-shaft 25, which is mounted in the frame-bars 5 and is provided with a sprocket-wheel 26. The upper end of the tedder 24 is connected by a link 27 to the transverse bar 23. A small axle 28 is loosely journaled in the section $5^c$ of the bars, and on the ends of this axle are secured traction-wheels 29. Said axle 28 has a sprocket-wheel 30, over which and the sprocket-wheel 26 of the crank-shaft 25 a sprocket-chain 31 is mounted to run. Hence under the advance movement of the machine motion will be imparted to the crank-shaft 25 and the tedder 24.

Located one on each side of the space left between the frame-bars 5 is one of a pair of forwardly-diverging collecting-plates. These plates are preferably constructed, as shown in the drawings, of semicylindrical imperforate material, such as sheet metal, and they are indicated as entireties by the numeral 32. The collecting-plates 32 are each provided with projecting trunnions at their upper edges which work in sockets 33, secured one on the main axle 2 and one on the adjacent frame-bar 5. At their lower edges the said collecting-plates are provided with short spring-fingers 34, preferably constructed as best illustrated in Figs. 6, 7, and 8, wherein the said fingers are provided with heads 35 and are detachably secured by nutted staples 36 and coöperating clamping-blocks 37.

Each collecting-plate 32 is provided with a vertically-projecting arm 38, which is connected by rod 39 to a latch-lever 40, which coöperates with the latch-segment 41. As shown, both of the latch-segments 41 are secured to the central portion of the main axle 2, and both of the levers 40 stand in front of the seat 22, where they may be easily manipulated by the driver. The rods 39 work loosely through the arms 38, being provided at their outer ends with heads 42 and inward of the said arms with adjustable collars 43. Springs 44, compressed between the collars 42 and the arms 38, yieldingly hold the said arms against the said heads 42. With this construction the collecting-plates may should they strike an obstacle, such as a rock or a stump, yield and pass over or clear the same. At the same time by means of the latch-levers 40 the said collecting-plates may be set in any desired adjustment and may be positively thrown and yieldingly held in inoperative positions.

When the machine is set for action, the various parts are adjusted as shown in the drawings. Under the advance movement of the machine the loose hay will be gathered up by the collecting-plates 32 and will be worked toward the center of the machine and into the accumulating-space in front of the rake 8. The tedder 24 serves to positively force the hay backward against the tines of the rake and serves as a packer. When the accumulating-space is filled with hay, the tedder or packer 24 will force the hay tighter and tighter into contact with the rake-tines 8, and when this pressure is sufficient to overcome the spring-held detent 20 the head 18 of the trip-rod 17 will be released from the said detent, and the said rake will then be free to swing rearward and upward and deposit the collected cock of hay on the ground. The rake may be restored to working position, as already indicated, by the lever 13.

It will of course be understood that the machine above described is capable of a large range of modification within the scope of my invention.

What I claim, and desire to secure by Letters Patent of the United States, is as follows:

1. In a machine of the character described the combination with the rake, of a detent yieldingly holding said rake in an operative position, and adapted to be overcome by excessive pressure on the said rake, substantially as described.

2. In a machine of the character described, the combination with the pivoted rake, of a detent for holding said rake in an operative position, and a trip, actuated by excessive pressure, to release said rake from said detent, and cause the same to deposit the hay in a cock, substantially as described.

3. In a machine of the character described, the combination with the rake, of a detent, for holding the same in an operative position, a trip for releasing said rake from said detent, and the tedder or packer for pressing the accumulated hay against said rake to actuate said trip, substantially as described.

4. In the machine of the character described, the combination with the pivoted rake, having the arm 11, of the lever 13 connected to said arm 11 by rod 12, the trip-rod 17, pivoted to said arm 11, the pivoted detent 20 coöperating with the end of said rod 17, and the adjustable spring 21, acting on said detent, substantially as described.

5. The combination of the pivoted rake of a detent yieldingly holding said rake in an operative position, a tedder or packer, working in front of the said rake, and a traction-wheel, with connections for driving said tedder, substantially as described.

6. In a machine of the character described, the combination with a rake and means for causing the same to discharge its load, of a pair of forwardly-diverging imperforate gathering-plates, which are approximately semicylindrical, and are provided on their under edges with yielding rake-teeth, substantially as described.

7. In a machine of the character described, the combination with a pivoted rake and means for causing the same to discharge its load, of a pair of forwardly-diverging concaved gathering-plates, the inner ends of which plates terminate approximately in line with the sides of said rake, but in advance thereof, and a tedder operating to positively force the gathered hay or stock backward between the inner ends of said gathering-plates and against said rake, substantially as described.

In testimony whereof I affix my signature in presence of two witnesses.

CHRIS E. PAULSON.

Witnesses:
O. J. FLAA,
A. H. LARSEN.